(12) United States Patent
Schnelzer (10) Patent No.: US 12,092,127 B2
(45) Date of Patent: Sep. 17, 2024

(54) TANDEM SEAL PUMP

(71) Applicant: CECO ENVIRONMENTAL IP INC., Dallas, TX (US)

(72) Inventor: Brian Schnelzer, Dallas, TX (US)

(73) Assignee: CECO ENVIRONMENTAL IP INC., Dallas, TX (US)

( * ) Notice: Subject to any disclaimer, the term of this patent is extended or adjusted under 35 U.S.C. 154(b) by 1070 days.

(21) Appl. No.: 16/969,333

(22) PCT Filed: Feb. 14, 2019

(86) PCT No.: PCT/US2019/018065
§ 371 (c)(1),
(2) Date: Aug. 12, 2020

(87) PCT Pub. No.: WO2019/161097
PCT Pub. Date: Aug. 22, 2019

(65) Prior Publication Data
US 2021/0048036 A1     Feb. 18, 2021

Related U.S. Application Data

(60) Provisional application No. 62/742,251, filed on Oct. 5, 2018, provisional application No. 62/630,621, filed on Feb. 14, 2018.

(51) Int. Cl.
*F04D 29/12*     (2006.01)
*F04D 29/043*     (2006.01)
(Continued)

(52) U.S. Cl.
CPC ......... *F04D 29/128* (2013.01); *F04D 29/043* (2013.01); *F04D 29/126* (2013.01);
(Continued)

(58) Field of Classification Search
CPC .... F16J 15/3484; F16J 15/3404; F16J 15/406; F16J 15/3412; F16J 15/348; F16J 15/002;
(Continued)

(56) References Cited

U.S. PATENT DOCUMENTS 4,669,738 A * 6/1987 Netzel ................. F16J 15/3484
277/374
5,217,234 A * 6/1993 Hornsby ............. F16J 15/3404
277/408
(Continued)

FOREIGN PATENT DOCUMENTS

WO    WO-2009122131 A1 * 10/2009 ........... F16J 15/3404
WO        2019161097 A1    8/2019

OTHER PUBLICATIONS

International Preliminary Report on Patentability dated Aug. 27, 2020, for International Application No. PCT/US2019/018065, filed on Feb. 14, 2019.
(Continued)

*Primary Examiner* — Dominick L Plakkoottam
(74) *Attorney, Agent, or Firm* — Michael W. Piper; Andrew M. Metrailer; Conley Rose, P.C.

(57) ABSTRACT

A pump having tandem seals includes a pump shaft, a pump housing, an inboard seal, an outboard seal, and a gland assembly. The pump housing defines a primary chamber between an interior surface of the pump housing and an outer surface of the pump shaft when the pump shaft is disposed within the pump housing. The inboard seal, the outboard seal, and the gland assembly are configured to be disposed within the primary chamber of the pump housing. The gland assembly is disposed between the inboard seal and the outboard seal, and the inboard seal, the gland assembly, and the outboard seal are configured to form a plurality of chambers within the pump housing.

19 Claims, 8 Drawing Sheets

(51) Int. Cl.
  *F04D 29/42*    (2006.01)
  *F04D 29/58*    (2006.01)
  *F16J 15/324*   (2016.01)
  *F16J 15/34*    (2006.01)

(52) U.S. Cl.
  CPC ......... *F04D 29/426* (2013.01); *F04D 29/584* (2013.01); *F16J 15/324* (2013.01); *F16J 15/3404* (2013.01); *F16J 15/3484* (2013.01); *F05D 2260/22141* (2013.01)

(58) Field of Classification Search
  CPC ........ F16J 15/162; F16J 15/324; F16J 15/342; F04D 29/126; F04D 29/128; F04D 29/043; F04D 29/106; F04D 29/108; F04D 29/12; F04D 29/122
  See application file for complete search history.

(56) References Cited

U.S. PATENT DOCUMENTS

| | | | | |
|---|---|---|---|---|
| 5,249,812 A * | 10/1993 | Volden | ................ | F16J 15/3404 277/408 |
| 5,421,593 A * | 6/1995 | Aritsubo | ............. | F16J 15/3484 277/927 |
| 5,529,315 A * | 6/1996 | Borrino | ................ | F16J 15/004 277/927 |
| 5,553,867 A * | 9/1996 | Rockwood | ........... | F16J 15/3484 277/432 |
| 5,624,245 A | 4/1997 | DeClerck et al. | | |
| 5,823,539 A * | 10/1998 | Rockwood | ............ | F16J 15/363 415/110 |
| 5,873,574 A * | 2/1999 | Ringer | ................ | F16J 15/363 277/389 |
| 5,954,341 A * | 9/1999 | Ringer | ................ | F16J 15/363 277/389 |
| 6,070,880 A * | 6/2000 | McKeever | ........... | F16J 15/3404 277/304 |
| 6,210,103 B1 * | 4/2001 | Ramsay | ................ | F16J 15/406 415/230 |
| 6,379,127 B1 * | 4/2002 | Andrews | ............... | F04D 13/083 277/408 |
| 6,708,980 B2 * | 3/2004 | Takahashi | ............ | F16J 15/3484 277/408 |
| 11,821,523 B2 * | 11/2023 | Wasser | ................ | F16J 15/002 |
| 2002/0060430 A1 * | 5/2002 | Takigahira | ........... | F16J 15/3484 277/361 |
| 2003/0178782 A1 * | 9/2003 | Takahashi | ........... | F16J 15/3404 277/408 |
| 2009/0212503 A1 * | 8/2009 | Huang | ................ | F16J 15/3484 277/513 |
| 2011/0006484 A1 * | 1/2011 | Dietle | ................ | F16J 15/3244 277/549 |
| 2013/0106062 A1 | 5/2013 | Hori et al. | | |
| 2013/0322794 A1 * | 12/2013 | Meuter | ................... | F04D 29/12 384/132 |
| 2015/0198172 A1 * | 7/2015 | Hermmen, Jr. | ....... | F04D 29/126 277/361 |
| 2015/0323078 A1 | 11/2015 | Berger et al. | | |
| 2016/0265667 A1 * | 9/2016 | Khan | ..................... | F16J 15/324 |
| 2017/0356453 A1 * | 12/2017 | Goldswain | ............... | F16J 15/40 |

OTHER PUBLICATIONS

International Search Report and Written Opinion dated Jun. 14, 2019, for International Application No. PCT/US2019/018065, filed on Feb. 14, 2019.

\* cited by examiner

TANDEM SEAL PUMP

CROSS-REFERENCE TO RELATED APPLICATIONS

The present application is a filing under 35 U.S.C. 371 as the National Stage of International Application No. PCT/US2019/018065, filed on Feb. 14, 2019 and entitled, "TANDEM SEAL PUMP," which claims the benefit of and claims priority to U.S. Provisional Patent Application No. 62/630,621, filed on Feb. 14, 2018 and entitled "Tandem Seal Pump", as well as U.S. Provisional Patent Application No. 62/742,251, filed on Oct. 5, 2018 and entitled "Tandem Seal Pump", all of which are incorporated herein by reference in their entirety for all purposes.

TECHNICAL FIELD

Embodiments related to high temperature industrial centrifugal pumps and more particularly to seals for such pumps.

BACKGROUND

As commercial and industrial environmental laws and regulations have evolved, often times equipment that was thought to be industry standard is found to be inadequate in the field. For many years the industry relied upon single mechanical seals in pumping equipment used for hot oil service (thermodynamic fluids).

The fluids used in these applications have garnered increased attention by environmental regulation groups and many are now considered hazardous material. The Dean RA series of pumps was designed specifically for these applications. The RA pump, however, was a pump that was designed around a specific seal (type 21) made by a specific manufacturer (John Crane). The seal in these pumps may not be sufficient for all uses.

SUMMARY

In some embodiments, a pump having tandem seals includes a pump shaft, a pump housing, an inboard seal, an outboard seal, and a gland assembly. The pump housing defines a primary chamber between an interior surface of the pump housing and an outer surface of the pump shaft when the pump shaft is disposed within the pump housing. The inboard seal, the outboard seal, and the gland assembly are configured to be disposed within the primary chamber of the pump housing. The gland assembly is disposed between the inboard seal and the outboard seal, and the inboard seal, the gland assembly, and the outboard seal are configured to form a plurality of chambers within the pump housing.

In some embodiments, a pump comprises a pump shaft, a plurality of fan blades coupled to the pump shaft, a pump housing, and a flow modifier disposed between the plurality of fan blades and one or more heat fins. The pump housing comprises the one or more heat fins on an outer surface of the pump housing, and the pump shaft is disposed within and passes through the pump housing. The flow modifier is configured to direct and concentrate an airflow from the plurality of fan blades onto the one or more heat fins of the pump housing when the pup shaft is rotating.

In some embodiments, a method of operating a pump having tandem seals comprises rotating a pump shaft that is disposed within a pump housing, pumping a fluid based on rotating the pump shaft, sealing the pumped fluid from an external environment using an inboard seal and an outboard seal disposed within the pump housing, rotating a plurality of fan blades coupled to the pump shaft based on rotating the pump shaft, generating an airflow based on rotating the plurality of fan blades, directing the airflow onto the pump housing, and maintaining a temperature of the inboard seal and the outboard seal below a threshold based on directing the airflow onto the pump housing.

While multiple embodiments are disclosed, still other embodiments will become apparent to those skilled in the art from the following detailed description. As will be apparent, some embodiments, as disclosed herein, are capable of modifications in various aspects without departing from the spirit and scope of the claims as presented herein. Accordingly, the detailed description herein below is to be regarded as illustrative in nature and not restrictive.

BRIEF DESCRIPTION OF THE DRAWINGS

For a detailed description of aspects of the disclosed methods, reference will now be made to the accompanying drawings in which.

DETAILED DESCRIPTION

Disclosed herein is a pump having a tandem seal design using two seals to help reduce or prevent leaks from the pump. As disclosed herein, the pump assembly can use the same castings and internal dimensions as prior pumps, but accommodate a tandem seal construction along with the accessory piping and reservoir as used in a tandem seal design.

The second seal in the tandem seal construction can be used to provide a secondary sealing system to prevent flammable, explosive, toxic or environmentally detrimental fluids from escaping the pump should the primary seal leak or an upset condition within the system or the pump occur.

For high temperature applications, mechanical seals rely on the elastomeric components used within the pumps remaining relatively cool in order for the materials in the seals to survive. In order to maintain the temperature at the seals below a threshold, cooling can be used with the pump. This cooling was often provided by using water either in jackets around the chamber in which the seal operated or to use cooling water in a small heat exchanger which would be used to cool a small stream of the pumped fluid that would then be injected back into the pump at the seal faces. These methods work well, but present problems associated with handling and disposing of the hot water. For large installations the water was sent to cooling towers or effluent ponds to cool and then be reprocessed through a waste water treatment facility on site. In many cases however the facility does not possess an entire waste water treatment plant and the water was simply allowed to flow down the drain, often at great expense.

Prior single seal designs could solve the problem of utilizing water to cool the mechanical seal. Such designs utilize ambient air and a specially designed sealing chamber to reduce the temperature at the seal from that present at the rotor that is at the temperature of the liquid being pumped through convective heat transfer. As an example, the convective cooling can allow the pump to process 650° F. liquid at the casing while keeping the seal below 200° F. within the seal chamber. This allowed pumps to use a much less expensive seal in its construction.

These pumps only used a single seal and were designed specifically for that arrangement. Although the current single seal technology has been used for years, its primary drawback is that the seal is a wearable component and is the last line of defense to prevent the pumped fluid from exiting the pump. Should the seal fail for any reason or should the seal wear over time, the pumped fluid can leak out of the pump and into the surrounding environment. Environmental codes and regulations prevent the release of thermodynamic fluids into the environment. The use of a tandem seal poses a problem with respect to being able to fit within the same seal chamber as the single seal while still being able to stay at a reasonable working temperature.

As disclosed herein, embodiments include numerous advantages including overcoming the disadvantages described above: providing a double seal, and maintaining a reasonable working temperature.

Described herein are embodiments of a tandem seal pump. The tandem or double seal provides a secondary line of defense against the pumped fluid leaking from the pump. This protects the environment, the equipment, and the personnel working on and around the equipment. The tandem or double seal uses an inert barrier fluid between the two seal faces to act as a buffer between the pumped fluid and the atmosphere. Any pumped fluid leaking into the buffer fluid is contained within the buffer system and can be detected by a rise in level or pressure, or through a visual inspection of the fluid, thus triggering an alarm and subsequent action by the end user to remedy the situation prior to allowing the pumped fluid to escape.

As described herein, the tandem seal pump comprises a pump shaft that can be surrounded by a pump housing. The pump shaft can connect a motor on one end to an impeller (not shown) on the other end. The pump housing can surround the shaft between the motor and impeller and serve to retain the seals. As described in more detail herein, the pump housing can define a primary chamber between the pump housing and the pump shaft. The chamber can house an inboard seal (e.g., the seal closest to the impeller), an outboard seal (e.g., the seal closest to the motor), and a gland assembly used to retain the seals. The seals and the land assembly are arranged to form a plurality of chambers within the housing.

The tandem seal design as described herein is unique in a number of ways. First, the seals used in the tandem seal design are contained in internal chambers or glands defined within the bearing housing. Within the internal chambers, the outboard seal contains a portion that rotates with the pump shaft. The configuration of the outboard seal allows the rotating portion to pump and circulate a barrier fluid between an external holding tank and the chamber within the housing. This allows the barrier fluid to be cooled as well as serving as a basis for detecting a leak of any pumped fluid that mixes with the barrier fluid. The barrier fluid can be an inert fluid such that even if the barrier fluid leaks past the outboard seal, any leakage will not be environmentally detrimental. Further, the use of the internal chambers allows the seals to be placed between the two pump bearings, including a bearing between the motor and the seal chamber and a second bearing at or near the impeller. The internal placement of the seals may help to protect the seals from external influence that can degrade the seals.

The design also uses a variety of features to maintain a temperature of the seal chambers below an upper allowable temperature for the seals. First, the shaft of the pump can be thinned to limit the conductive heat transfer from the high temperature fluid to the bearing housing and seals. Further, a bearing housing cowling can be used to direct the flow of cooling air onto the exterior of the seal chambers. Optional cooling fins can be used to provide further cooling in combination with the increased and directed airflow. The air cooling can then be used to maintain the temperature in the seal chamber below a threshold temperature for the seals.

As used herein, the term "inboard" refers to a direction or location from the pump motor towards the pump rotor. The term "outboard" refers to a direction or location from the pump rotor towards the pump motor. For example, the inboard seal is closer to the pump rotor than the outboard seal, and the outboard seal is closer to the pump motor than the inboard seal.

Figure 1:
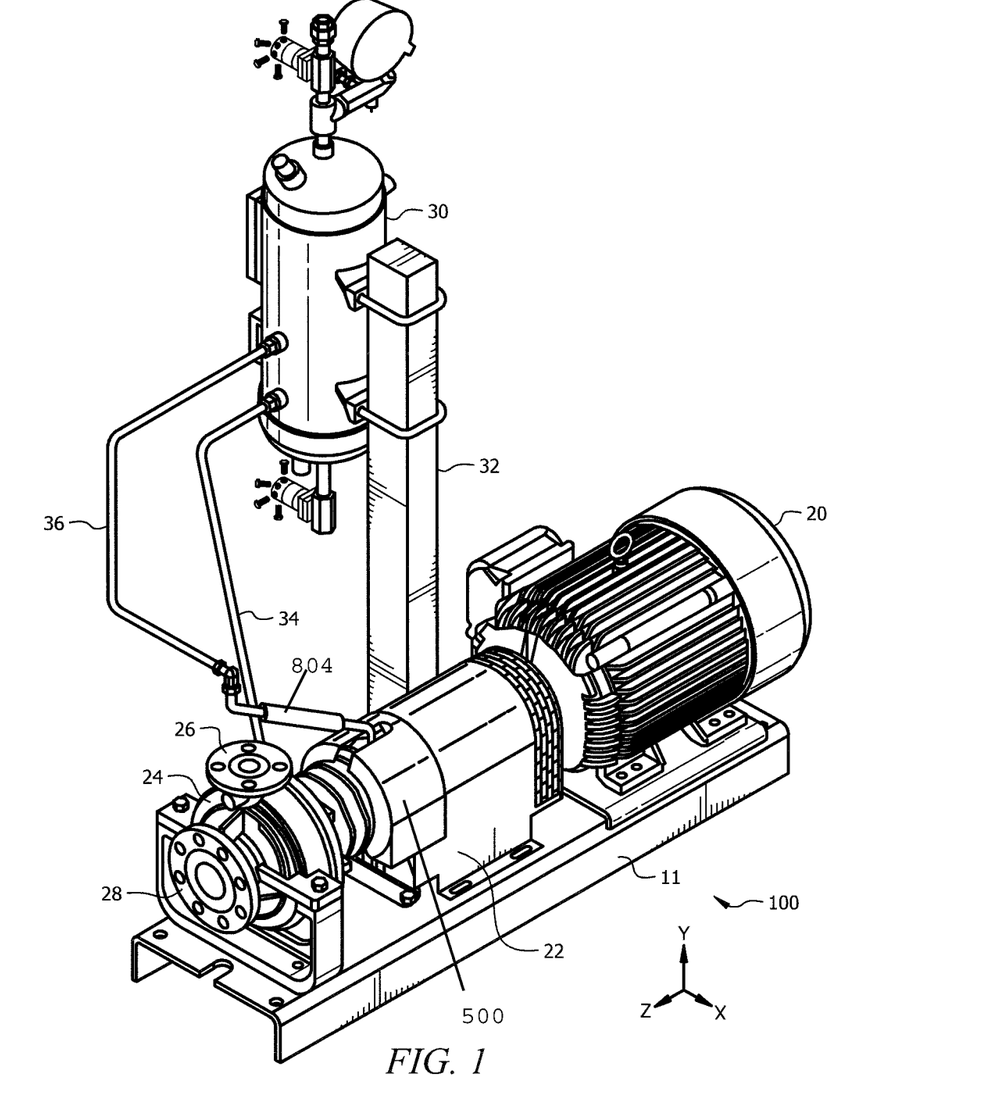
FIG. 1 is a schematic view of a tandem seal pump according to an embodiment.

The tandem seal pump system as disclosed herein can be used to pump various fluids, including high temperature fluids such as thermal transfer fluids. An overview of a tandem seal pump system 100 is shown in FIG. 1. As illustrated, the tandem seal pump system includes a motor 20 coupled through a pump shaft to the pump rotor 24. When the rotor 24 turns within the rotor housing, a fluid can be drawn through pump inlet 28 and forced outwards, resulting in an outlet flow through pump outlet 26 with an increased pressure. A cowling or flow modifier 22 can be placed over a portion of the pump shaft having fan blades coupled thereto. The fan blades serve to force air towards the pump rotor 24, and the flow modifier 22 serves to direct and concentrate the airflow onto the pump housing 23, thereby providing air cooling to the pump housing 23. The tandem seals reside within the pump housing 23. A barrier fluid can be pumped using a portion of the outboard seal from a barrier fluid reservoir 30 into an outboard gland through line 34, through supply line 34, and returned to the barrier fluid reservoir 30 through the return line 36. The barrier fluid reservoir 30 can be supported on a post 32. A pump base 11 can serve to support the motor 20, the pump rotor 24, and the post 32, thereby providing a packaged tandem seal pump system 100 as a single component.

Figure 2:
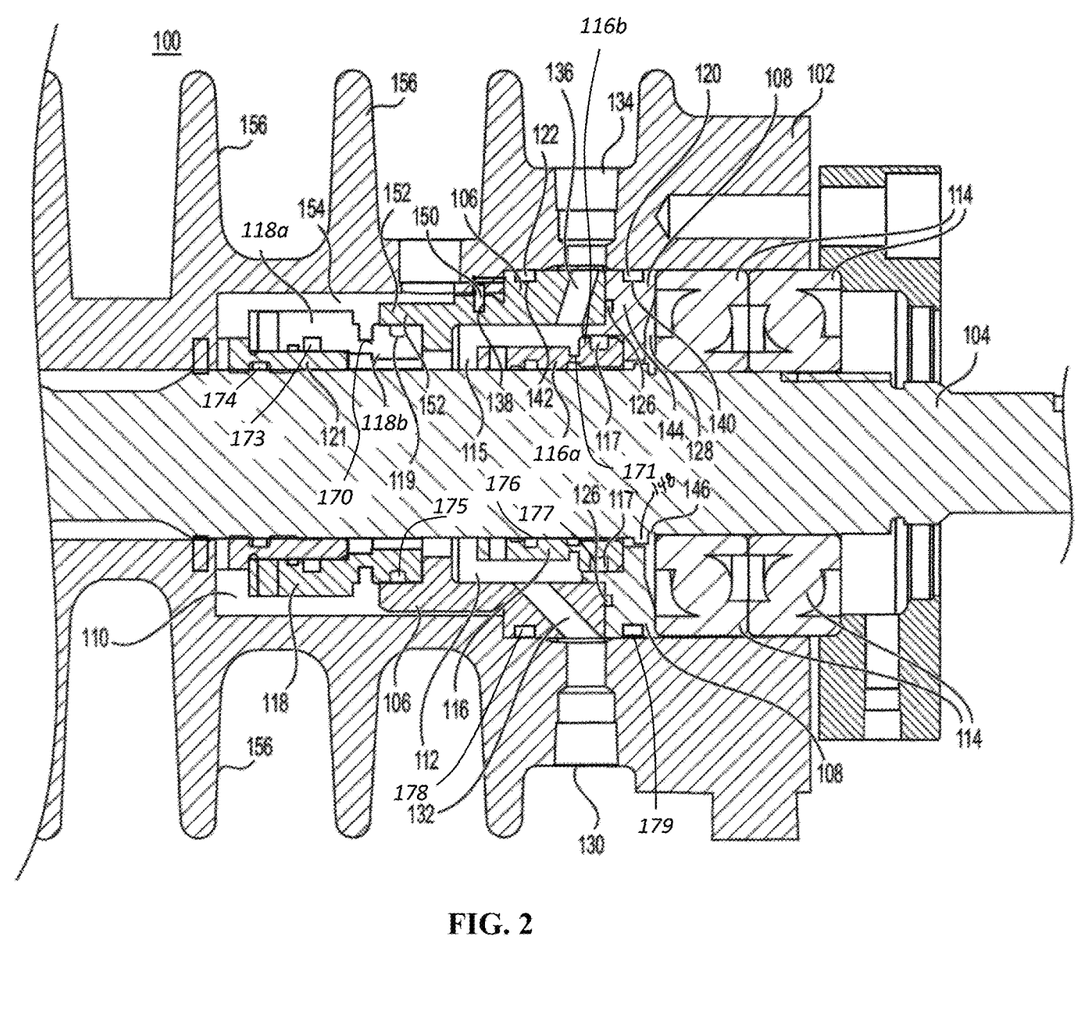
FIG. 2 illustrates a cross-sectional side view of exemplary embodiment of a tandem seal pump.

The pump housing 102 can contain the tandem seals internally. FIG. 2 illustrates a cross-section side view of exemplary embodiment of a tandem seal pump 100 that includes the motor 20, the pump housing 102, and the pump rotor 24. The view shown of tandem seal pump 100 is a close-up or zoomed-in view of a portion of the pump housing that houses or includes a tandem seal. As shown, the tandem seal pump 100 includes the bearing housing 600, discussed below with respect to FIGS. 7A-B, the pump shaft 104, an inboard gland 106 and an outboard gland 108. Within the bearing housing 600 is a primary chamber 110 through which the pump shaft 104 passes and in which the inboard gland 106 and the outboard gland 108 are formed.

The inboard gland 106 and the outboard gland 108 form three separate chambers or spaces. First, an inboard chamber 107 is formed between the pump rotor and the inboard side of the inboard seal 118. The inboard chamber 107 is in fluid communication with the fluid being pumped, and the inboard chamber 107 contains a small amount of the pumped fluid in contact with the inboard side of the inboard seal 118. Similarly, an outboard chamber 109 is formed within the pump housing 102 between the atmosphere and the outboard side of the outboard seal 116. Between the inboard gland 106 and the outboard gland 108 is formed an inner or barrier chamber 112. The barrier chamber 112 acts as a chamber within a chamber, specifically as a chamber within the primary chamber 110. The two sets of seals creating the barrier chamber 112 within the primary chamber 110 provide the double or tandem seal of tandem seal pump 100. The barrier chamber 112 keeps barrier fluid separate from fluid pumped through the tandem seal pump 100, which is present in the primary chamber 110. The barrier fluid within the barrier chamber 112 is in contact with the outboard side of the inboard seal 118 and the inboard side of the outboard seal 116. The barrier fluid provides additional cooling for the tandem seal pump 100, as described in more detail herein.

The seals form a sealing surface across a sealing face that lies on a plane that is perpendicular to the longitudinal axis of the pump shaft 104. A first portion of the seal is rigidly coupled to the pump shaft 104 and rotates with the shaft 104 while the second portion of the seal is stationary with respect to the pump housing 102. The interface between the stationary portion and the rotating portion is flat and serves to provide a sufficient pressure barrier to effectively reduce or prevent leakage across the seal face. Specifically, the inboard seal 118 comprises a rotational portion 118a and a stationary portion 118b. The rotational portion 118a is coupled to the pump shaft 104 through the use of one or more set screws or threaded connections and/or one or more connectors 121. One or more seals such as o-ring 173 and/or o-ring 174 can be used to provide a seal between the rotating portion 118a of the inboard seal and the shaft 104. The stationary portion 118b of the inboard seal 118 can be coupled to the inboard gland 106. One or more seals such as o-ring 175 can be used to form a sealing engagement between the stationary portion 118a of the inboard seal 118 and the inboard gland 106. A radial interface 170 can be present at the point at which the rotational portion 118a and the stationary portion 118b contact. The interface 170 can serve as the sealing surface that separates the inboard chamber 107 from the barrier chamber 112 between the inboard seal 118 and the outboard seal 116.

Similarly, the outboard seal 116 comprises a rotational portion 116a and a stationary portion 116b. The rotational portion 116a is coupled to the pump shaft 104 through the use of one or more set screws or threaded connections. One or more seals such as o-ring 176 can be used to provide a seal between the rotating portion 116a of the outboard seal and the shaft 104. The stationary portion 116b of the outboard seal 116 can be coupled to the inboard gland 106. One or more seals such as o-ring 175 can be used to form a sealing engagement between the stationary portion 118b of the inboard seal and the outboard gland 108. A radial interface 171 can be present at the point at which the rotational portion 116a and the stationary portion 116b contact. The interface 171 can serve as the sealing surface that separates the barrier chamber 112 from the outboard chamber 109.

With continuing reference to FIG. 2, located within the primary chamber 110 are ball bearings 114, located outboard of and adjacent to the outboard gland 108. The ball bearings 114 form an outboard bearing for the pump and serve to support and align the pump shaft 104 within the pump housing 102. The stationary portion 116b of the secondary or outboard seal 116 is partially positioned within a narrow, inboard end of the outboard gland 108 and seals one end of the barrier chamber 112. The stationary portion 118b or ring of the primary or inboard seal 118 can be partially positioned within a narrow, inboard end of the inboard gland 106 and can seal the other end of the barrier chamber 112. The portion of the outboard seal 116 located within the narrow, inboard end of the outboard gland 108 can include an o-ring channel 117 containing an o-ring 177 that seals the outboard seal 116 within the outboard gland 108, preventing rotation of the stationary portion 116b of the outboard seal 116. Likewise, the portion of the inboard seal 118 located within the narrow, inboard end of the inboard gland 106 includes an o-ring channel 119 containing an o-ring 175 that seals the inboard seal 118 within the inboard gland 106, preventing rotation of the stationary portion 118b of the inboard seal 118. Multiple o-rings, including o-ring 120, o-ring 122, o-ring 126, and o-ring 128, may also help seal the barrier chamber 112 as described below.

Also located within the barrier chamber 112 is pumping ring 115 portion of secondary seal. The pumping ring 115 is effectively a paddle wheel that is connected to the pump shaft 104. The paddle wheel 115, therefore, rotates with the pump shaft 104, to serve as a centrifugal pump for the barrier fluid. This serves to move the barrier fluid inside the barrier chamber 112, causing heated barrier fluid to escape through the barrier fluid outlets (described below). The inboard seal 118 also includes a rotating portion 118a that is attached to pump shaft 104 and rotates with pump shaft 104. The rotating portion 118a can, in some embodiments, help to pump fluid through bearing housing 600.

In some embodiments, the rotational portion 118a of the inboard seal 118 is smooth to limit the degree of movement of the pumped fluid in contact with the inboard seal 118. By limiting any circulation of the pumped fluid in contact with the inboard seal 118, any convective heat transfer of heat from the pumped fluid can be limited. In some embodiments, a bearing adjacent the impeller can be used to support the pump shaft at the bearing housing 600. The bearing can serve to limit the flow of the pumped fluid into the pump housing. While the pumped fluid is present around the pump shaft within the pump housing and in contact with the inboard side of the inboard seal, limiting the flow of the pumped fluid between the impeller housing and the inboard seal can help to reduce the overall heat transfer from the pumped fluid to the inboard seal.

As is described in further detail herein, certain components of the tandem seal pump 100 positioned within chamber 110, such as inboard gland 106 and outboard gland 108, remain stationary or fixed with respect to housing 102, while other components rotate with pump shaft 104.

As shown in FIG. 2, the inboard gland 106 and the outboard gland 108 are configured to engage each other and fit within the primary chamber 110. The inboard gland 106 and the outboard gland 108, when engaged with each other and when disposed within the primary chamber 110, serve to properly space the inboard seal 118 and the outboard seal 116 as well as forming the barrier chamber. Thus, the inboard gland 106 and the outboard gland 108 form a part of the tandem seal design that allows both seals to be disposed within the pump housing 102.

Figures 3A, 3B, 3D:
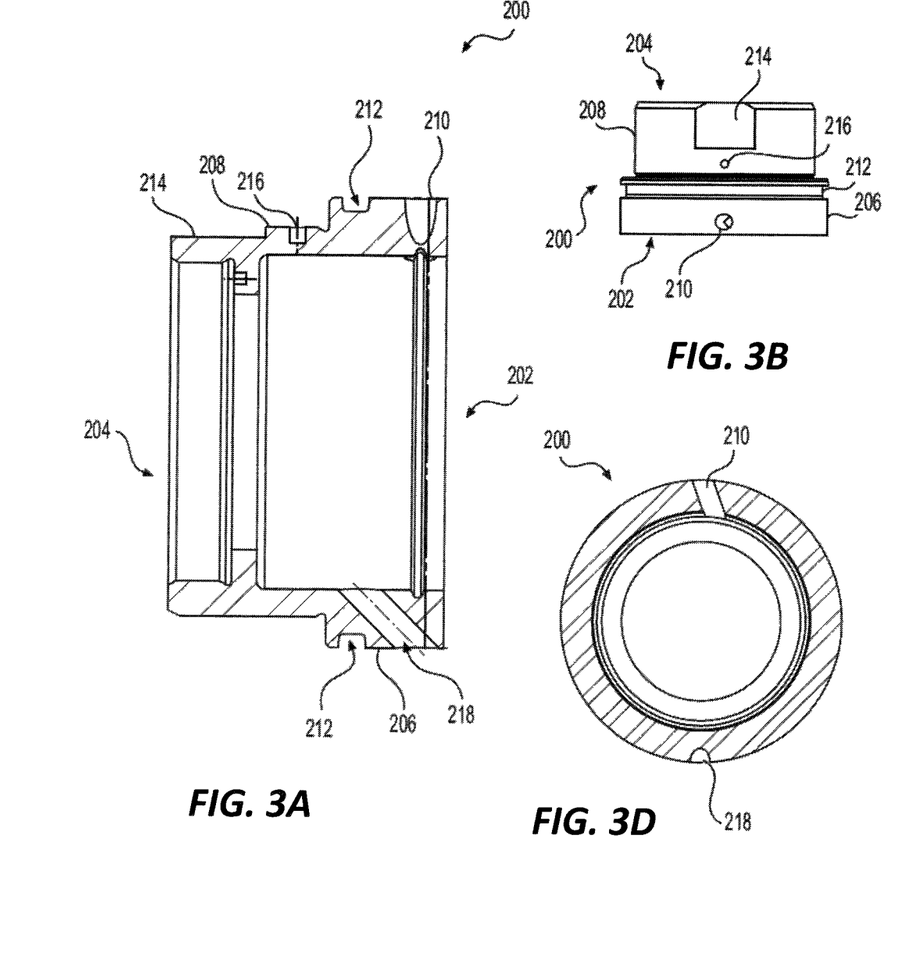
FIG. 3A is a cross-sectional side view of an embodiment of an inboard gland.
FIG. 3B shows a top view of an embodiment of the inboard gland.
FIG. 3D shows a cross-sectional view of the embodiment of the inboard gland from a line intersecting with the barrier fluid outlet and the barrier fluid inlet, viewed from a direction facing the inboard opening and away from the outboard opening.

With reference now to FIGS. 3A-3E, the inboard gland is shown in more detail. Embodiments of the inboard gland 200 may be used in the tandem seal pump 100, e.g., as shown in FIG. 2 as the inboard gland 106. Shown in FIG. 3A is a cross-sectional side view of the inboard gland 200. The inboard gland 200 includes or defines two openings, an outboard opening 202 and an inboard opening 204. When installed in the housing (e.g., housing 102), the outboard gland (e.g., the outboard gland 108) mates with and fits within the outboard opening 202 of the inboard gland 200 to form the barrier chamber described herein (e.g., barrier chamber 112). The inboard gland 200 is generally cylindrical in shape, with a wide portion 206 that defines and is proximate to the outboard opening 202 and a narrow portion 208 that defines and is proximate the inboard opening 204. The inboard gland is typically made of metal, a composite, or the like.

The inboard gland 200 and, more particularly the wide portion 206, also includes and defines a barrier fluid outlet 210, a partial cross-section of which is shown in FIG. 3A. In some embodiments, the barrier fluid outlet 210 is defined at an angle (e.g., twenty degrees 20° from perpendicular) to assist and improve barrier fluid outflow from the barrier chamber. The wide portion 206 of the inboard gland 200 also includes and defines a circumferential o-ring seat or channel 212 in which an o-ring (e.g., o-ring 178 of FIG. 2) is seated. The o-ring provides a seal around the circumference of the inboard gland 200, which seals the inboard gland 200 against the inner walls of the pump housing within the primary chamber (e.g., inner chamber 112). The narrow portion 208 of the inboard gland 200 also includes and defines a shoulder forming a flat area or shelf 214. The flat area 214 enables better venting of bearing housing 600 during installation of the pump as is described in more detail below.

With continuing reference to FIG. 3A, on the narrow portion 208 of the inboard gland 200 is a spring pinhole 216. In some embodiments of the tandem seal pump, the inboard gland 200 can remain stationary in the pump housing when the pump shaft rotates while the tandem seal pump is in use. The spring pinhole 216 may hold a spring pin that clocks or aligns the inboard gland 200 and retains the inboard gland 200 stationary relative to the bearing housing 600 when the tandem seal pump is in use. Alternatively, other mechanisms for holding the inboard gland 200 stationary may be used.

With reference now to FIG. 3B, shown is a top view of the inboard gland 200. Illustrated in FIG. 3B are the outboard opening 202, the inboard opening 204, the wide portion 206, and the narrow portion 208 of the inboard gland 200, the barrier fluid outlet 210, the o-ring seat or channel 212, the ventilation flat area 214, and the spring pinhole 216.

Figure 3C:
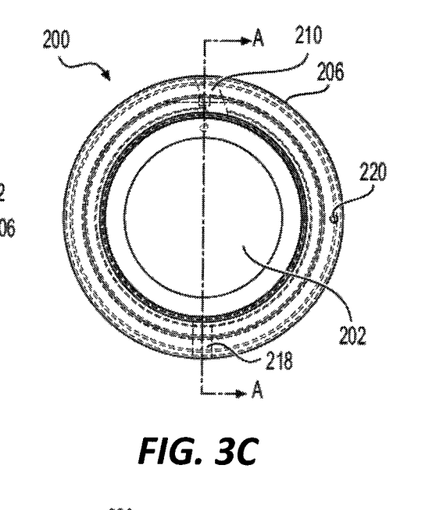
FIG. 3C shows a cross-sectional view of the embodiment of the inboard gland looking through the outboard opening into interior of the inboard gland.

With reference now to FIG. 3C, shown is cross-sectional view of the inboard gland 200 looking through the outboard opening 202 into interior of the inboard gland 200. Shown is cross-section of the wide portion 206 of the inboard gland 200. Within the cross-section view of the wide portion 206 is shown the barrier fluid outlet 210. The orientation or tilt of the barrier fluid outlet 210, e.g., at twenty degrees (20°) from perpendicular, is illustrated by this cross-section view. The pump shaft (e.g., the pump shaft 104) and, therefore, the paddle wheel located in barrier chamber (e.g., the paddle wheel 115) can rotate counter-clockwise within the interior of the inboard gland 200 shown in FIG. 3C. Consequently, the tilt or orientation of the barrier fluid outlet 210 cooperates with the counter-clockwise rotation of the paddle wheel to pump barrier fluid more effectively and efficiently (i.e., more barrier fluid exits the barrier fluid outlet 210 than if barrier fluid outlet 210 were aligned with the perpendicular axis through center of the inboard gland 200). If the pump shaft were to rotate clockwise, the tilt or orientation of the barrier fluid outlet 210 could be alternatively aligned to account for the difference in the rotational direction.

The barrier fluid is used to lubricate the seals during use and also serves to transfer or absorb heat in order to cool the seals. The barrier fluid is in contact with the outboard side of the inboard seal 118, the inboard side of the outboard seal 116, and is in contact with and surrounds the pump shaft inside the barrier chamber formed by inboard gland 200 and outboard gland. Any heat conducted through the pump shaft can be transferred to the barrier fluid, and the hotter barrier fluid can be circulated to the outlet of the inboard gland 200 through barrier fluid outlet 210. The barrier fluid pumped through barrier fluid outlet 210 can pass to the barrier fluid reservoir where it can cool prior to being recirculated to the barrier fluid inlet 218. In order to continue to effectively transfer heat, the cooler barrier fluid in the barrier fluid reservoir can replace the heated barrier fluid that exits through barrier fluid outlet 210. The inboard gland 200 includes barrier fluid inlet 218, which can be located approximately opposite the barrier fluid outlet 210 The barrier fluid inlet 218 may also be located in the wide portion 206 of the inboard gland 200. The barrier fluid inlet 218 may be tilted or oriented at an angle away from outboard opening 202. The flow of the barrier fluid out of the barrier fluid outlet 210 and the force created by the paddle wheel within the barrier chamber may create a pressure differential that pulls fresh, cooled barrier fluid into the barrier chamber. The barrier fluid may come from the barrier fluid reservoir external to the tandem seal pump.

Figure 9:
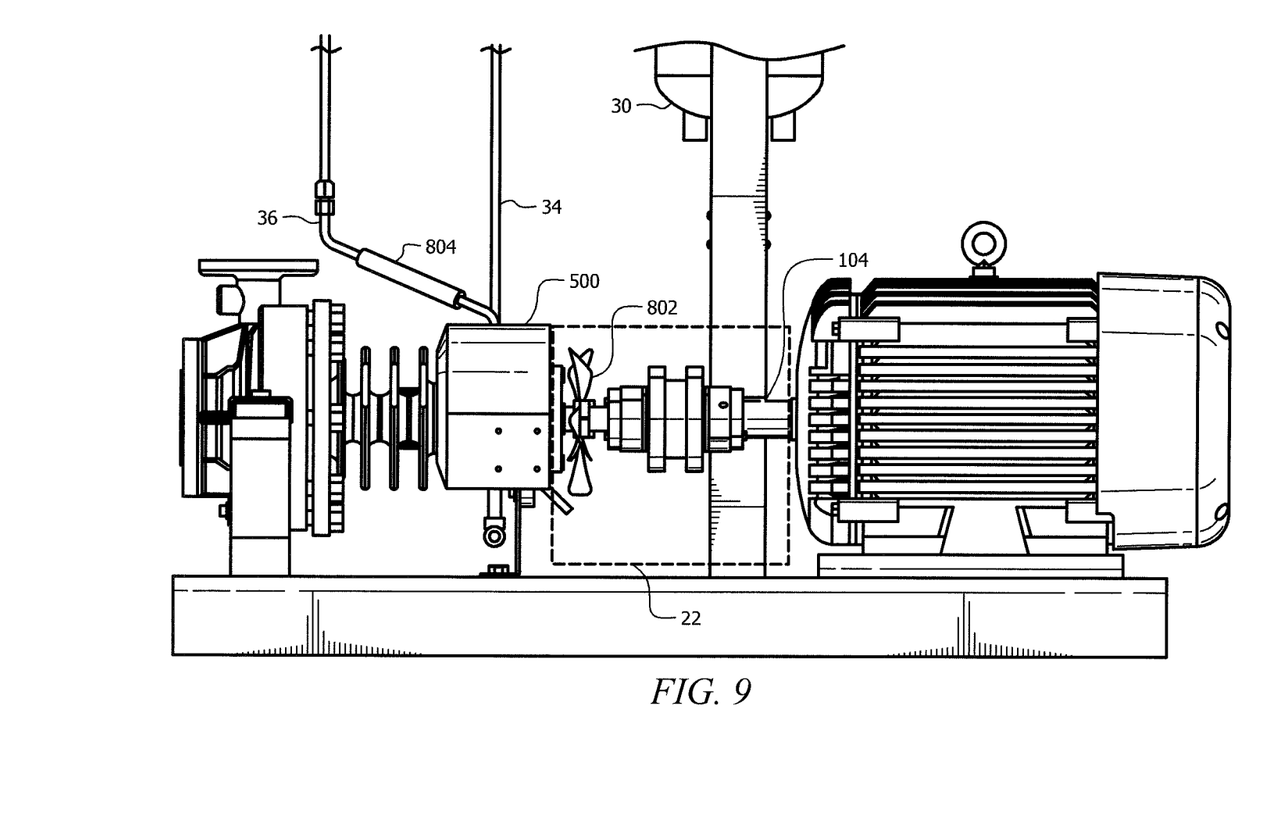
FIG. 9 shows another schematic view of a tandem seal pump.

In order to aid in cooling the barrier fluid, the return line 36 from the tandem seal pump to the barrier fluid reservoir can also have heat fins 804 as shown in FIG. 9. These heat fins 804 can help to exchange heat from the heated barrier fluid with the air prior to the barrier fluid returning to the reservoir 30. The heat fins 804 on the barrier fluid return line 36 can be placed in a position where air blown by the blower fan blades 802 passes over the heat fins 804 to provide air cooling.

Returning to FIG. 3C, as noted above, in operation of the tandem seal pump, the inboard gland 200 can be held stationary while the pump shaft rotates. The outboard gland (e.g., outboard gland 108) can also be held stationary while the pump shaft rotates. The outboard gland 108 may be held stationary by being clocked or aligned to and engaged with the inboard gland 200. In some embodiments, the inboard gland 200 can include a clocking spring pinhole 220 that contains a spring pin that clocks the inboard gland 200 to the outboard gland 108. As the inboard gland 200 is held stationary by the spring pin located in the spring pinhole 216 that clocks the inboard gland 200 to the interior of bearing housing 600, the outboard gland 108 can also be held stationary by a spring pin in the clocking spring pinhole 220.

With reference now to FIG. 3D, shown is a cross-section view of the inboard gland 200 from a line intersecting with the barrier fluid outlet 210 and the barrier fluid inlet 218, viewed from a direction facing the inboard opening 204 and away from the outboard opening 202. As shown, the tilt or orientation of the barrier fluid outlet 210 is at an angle relative to perpendicular to the longitudinal axis of the shaft. The view also illustrates the tilt or orientation of the barrier fluid outlet 210 away from the outboard opening 202.

Figure 3E:
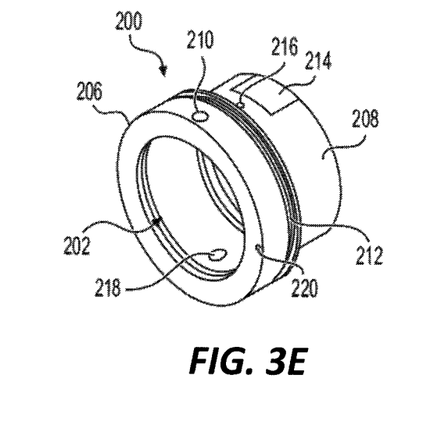
FIG. 3E shows a perspective view of the embodiment of the inboard gland.

With reference now to FIG. 3E, shown is a perspective view of the inboard gland 200. Shown are the outboard opening 202, the inboard opening 204, the wide portion 206, the narrow portion 208, the barrier fluid outlet 210, the circumferential o-ring channel 212, the flat portion 214, the spring pinhole 216, the barrier fluid inlet 218, and the clocking spring pinhole 220.

Figure 4A:
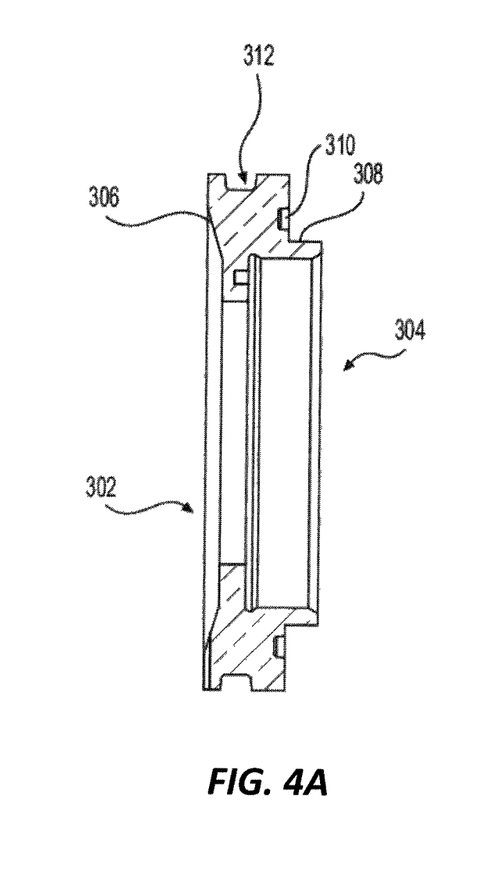
FIG. 4A shows a cross-sectional side view of an embodiment of the outboard gland.
Figure 4B:
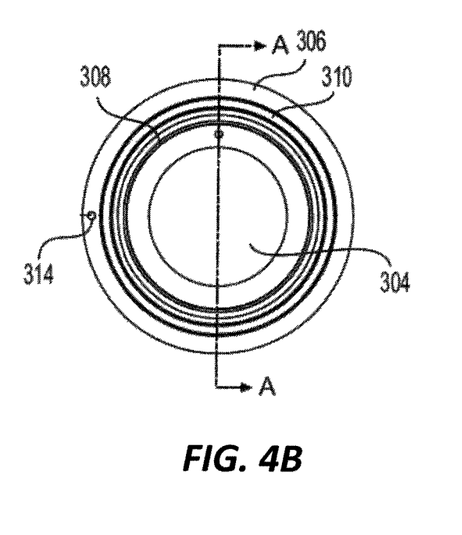
FIG. 4B shows a view of the embodiment of the outboard gland looking through the inboard opening.
Figure 4C:
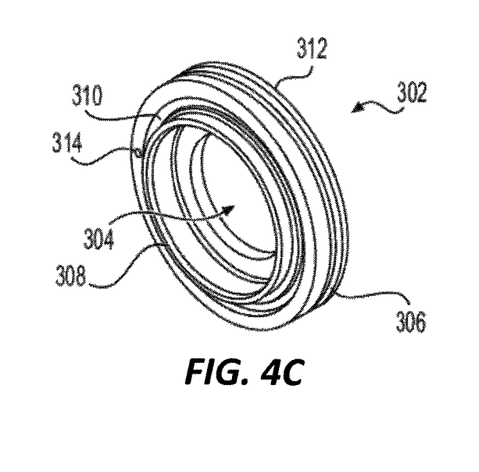
FIG. 4C shows a perspective view of the embodiment of the outboard gland.

With reference now to FIGS. 4A-4C, shown are various views of an embodiment of an outboard gland 300. The outboard gland 300 may be used in the tandem seal pump 100, e.g., as shown in FIG. 2 as the outboard gland 108. Shown in FIG. 4A is a cross-sectional side view of the outboard gland 300. The outboard gland 300 can include or define two openings, an outboard opening 302 and an inboard opening 304. When installed in the housing (e.g., the housing 102), the outboard gland 300 can mate with and fit within the outboard opening 202 of the inboard gland 200 (e.g., the inboard gland 106). The outboard gland 300 is typically made of some type of metal, composite material, or the like.

The outboard gland 300 can generally be cylindrical in shape, with a wide portion 306 that defines and is proximate to the outboard opening 302 and a lip or narrow portion 308 that defines and is proximate to the inboard opening 304. The lip 308 fits within the outboard opening of the inboard gland. Immediately above and surrounding the lip 308 is an o-ring groove 310 in which a sealing o-ring may be placed. The o-ring in o-ring groove 310 can seal the outboard gland 300 to the inboard gland 200 when the outboard gland 300 is mated to the inboard gland 200.

The wide portion 306 can also include and define a circumferential o-ring seat or channel 312 in which an o-ring (e.g., o-ring 178 o-ring, 179) can be seated. The o-ring provides a seal, around the circumference of the outboard gland 300 that seals the inboard gland 200 against the inner walls of the pump housing within the primary chamber (e.g., primary chamber 110).

With reference now to FIG. 4B, shown is a view of the outboard gland 300 looking through the inboard opening 304. Shown are the lip or the narrow portion 308, surrounding the o-ring groove 310, and the side of the wide portion 306. Also shown is the clocking spring pinhole 314 that contains the spring pin that clocks the outboard gland 300 to the inboard gland 200 when the outboard gland 300 and the inboard gland 200 are mated together. In use, the spring pin fits within both the clocking spring pinhole 314 and the clocking spring pinhole 220. In this manner, the spring pin may be considered or referred to as an anti-rotation pin.

With reference now to FIG. 4C, shown is a perspective view of the outboard gland 300. Shown are the inboard opening 304, the wide portion 306, the narrow portion or lip 308, the o-ring groove 310, the circumferential o-ring channel 312, and the clocking spring pinhole 314.

Figure 5:
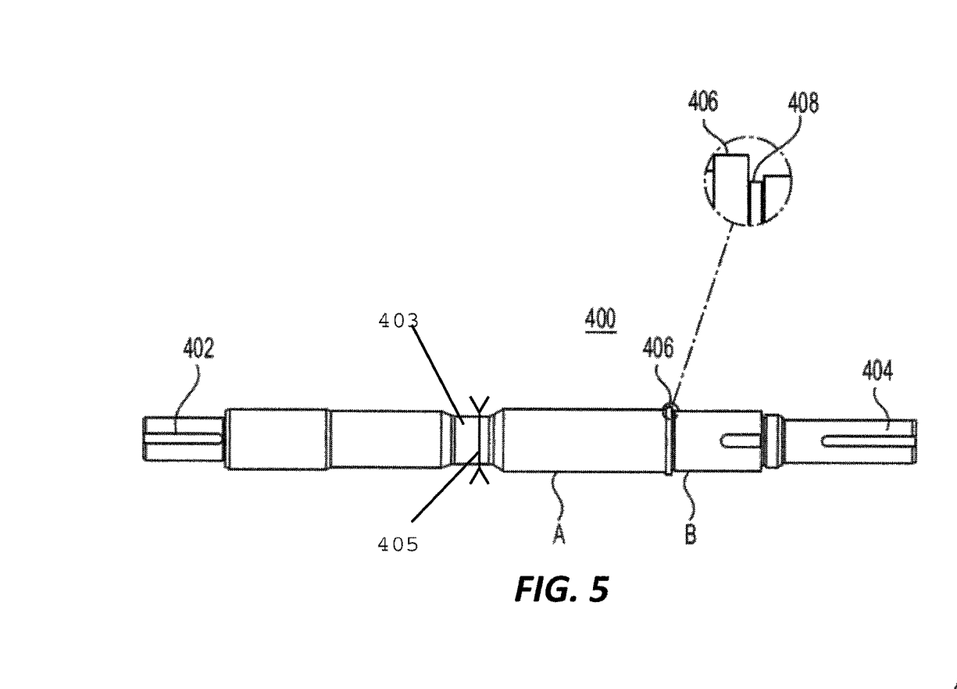
FIG. 5 shows a side view of an embodiment of a pump shaft.

With reference now to FIG. 5 shown is a side view of an embodiment of a pump shaft 400. In some embodiments, the pump shaft 400 can be used as the pump shaft 104 in FIG. 2. The pump shaft 400 can include an impeller end 402 and a motor end 404. An impeller attached to the impeller end 402 can be rotated by the rotating pump shaft 400. The pump shaft 400 can be rotated by the motor (e.g., motor 20 of FIG. 1) attached to the motor end 404. The rotating impeller can cause a small circulation of heated pumped fluid through bearing housing (e.g., bearing housing 600) of the tandem seal pump 100, which can be limited by the use of the inboard bearing 180 for the pump shaft adjacent the impeller housing.

The overall length of pump shaft 400 can be selected based on the pump needs as well as the motor horsepower and impeller specifications. In some embodiments, the pump shaft 400 can be between approximately 15 and 30 inches, between approximately 18 and 25 inches, or between approximately twenty to twenty one inches. The temperature drop achieved by the tandem seal pump may be illustrated with reference to FIG. 5 and the pump shaft 400. In some embodiments, the distance from the impeller end 402 to point "A" on the pump shaft 400 can be about nine to 15 inches, or about twelve to about thirteen inches. Over this distance, some embodiments of the tandem seal pump may achieve a temperature drop of approximately 450 degrees (450°) Fahrenheit (e.g., from about 650° to about 200° Fahrenheit). In some embodiments, the chamber (e.g., chamber 110) in which the inboard gland 200 and the outboard gland 300 are situated can be located between points "A" and "B" on the pump shaft 400. As shown, the pump shaft 400 can include a lip 406 and a channel or groove 408 that helps to form a seal enclosing the inboard gland 200 and the outboard gland 300 with the chamber inside the bearing housing 600. The section of the pump shaft 400 between points A and B may be lengthened, to accommodate inboard gland 200 and outboard gland 300. For example, the section between points A and B may be lengthened between about 0.5 and about 6 inches, or between about one to two inches (1" to 2") to accommodate the tandem seal design. This lengthening may further aid in the ability to cool the pump housing at the seals.

As shown in FIG. 5, the pump shaft may have a thinned portion having a reduced diameter between the impeller end 402 and the point A on the shaft. The thinned portion may aid in retaining the temperature of the seals below a threshold by presenting a reduced cross sectional area for conductive heat transfer from the impeller end 402 of the pump shaft into the pump housing. The length of the reduced area section may be selected to retain the mechanical strength of the pump shaft while reducing the conductive heat transfer to a level at which the temperature at the seals can be maintained below a threshold temperature. In some embodiments, the thinned portion may have a cross-section area taken along the longitudinal axis of the pump shaft that is greater than 60%, 70%, 80, or 90% of the cross section area of the shaft at point A (e.g., the shaft inboard and/or outboard of the thinned region). In some embodiments, the thinned portion may have a cross-section area taken along the longitudinal axis of the pump shaft that is less than 99%, 98%, 96%, 94%, or 90% of the cross section area of the shaft at point A (e.g., the shaft inboard and/or outboard of the thinned region).

Figure 6:
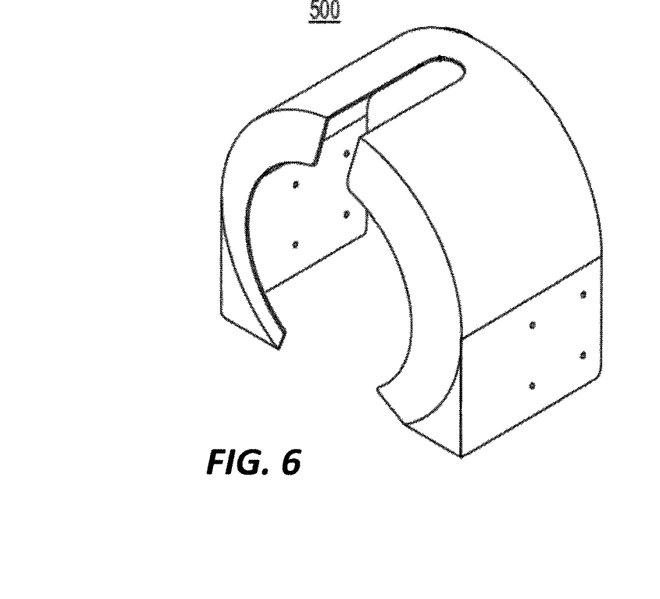
FIG. 6 shows a perspective view of an embodiment of flow modifier.

With reference now to FIG. 6, shown is a perspective view of an embodiment of flow modifier 500 (e.g. flow modifier 22 of FIG. 1). Flow modifier 500 alters the flow of air blown on and over the exterior of the pump housing, more effectively cooling heated fluid. As shown in FIG. 9, one or more fan blades 802 can be coupled to the pump shaft 104 and rotate with the pump shaft 104 during use. A coupling guard can be present over the pump shaft 104 to protect users from the rotating shaft. The flow modifier 500 can be coupled to an inboard end of the coupling guard and serve to concentrate and direct the blow air onto a point of the pump housing aligned with the inboard seal 118 and/or the outboard seal 116. The blown air can interact with the heat fins 156 present on the pump housing 102 to enable efficient heat transfer from the pump housing, thereby cooling the pump housing to maintain the seals below a threshold temperature.

Figure 7A:
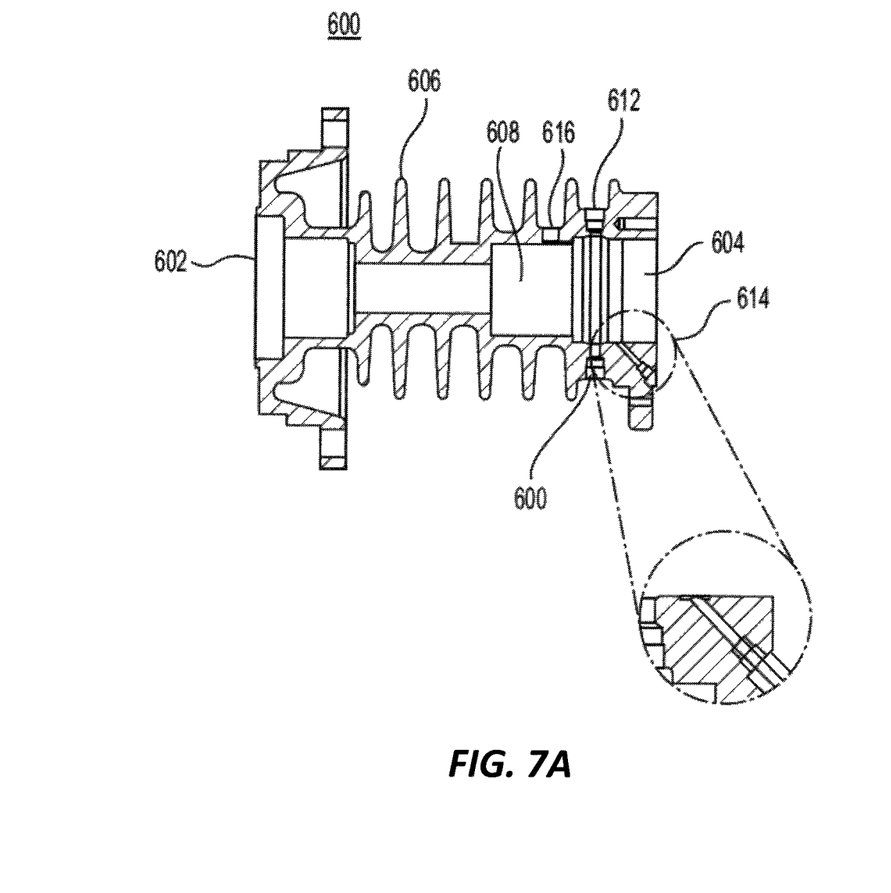
FIG. 7A shows a cross-sectional view of an embodiment of a bearing housing.
Figure 7B:
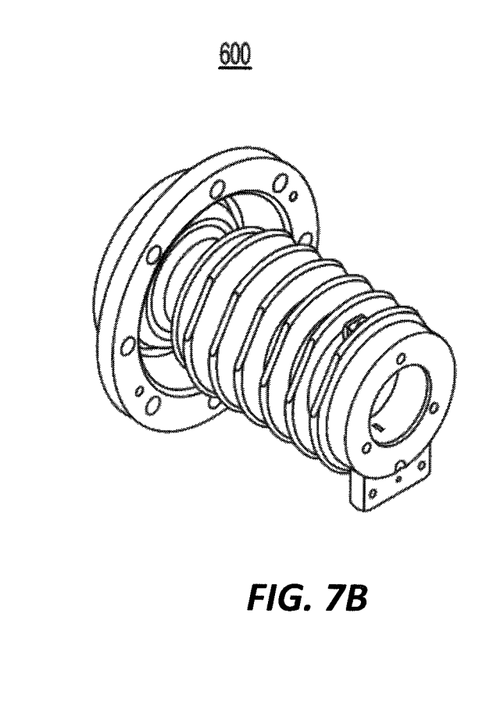
FIG. 7B shows a perspective view of an embodiment of a bearing housing.

With reference now to FIGS. 7A-7B, shown is an embodiment of bearing housing 600. Bearing housing 600 includes an inboard end 602, an outboard end 604, heat fins 606, a chamber 608, a barrier fluid inlet 610, a barrier fluid outlet 612, an emergency fluid exit 614, and a vertical plug 616. The shaft 400 can be inserted into the bearing housing 600 with the impeller end 402 proximate the inboard end 602 and the motor end 404 proximate the outboard end 604. The heat fins 606 can help to conduct heat away from the interior of the bearing housing 600, helping to cool fluid flowing through bearing housing 600. The chamber 608 can contain the inboard gland 200 and the outboard gland 300, as described above with reference to the chamber 110 and FIG. 2. The barrier fluid inlet 610 aligns with and is coupled to the barrier fluid inlet 218 of inboard gland 200 and enables the barrier fluid to be provided from the external source (e.g., the barrier fluid reservoir) into the inner chamber formed by the inboard gland 200 and the outboard gland 300. The barrier fluid outlet 612 aligns with and is coupled to the barrier fluid outlet 212 of the inboard gland 200. The barrier fluid outlet 612 enables the tandem seal pump to remove barrier fluid from the inner chamber formed by the inboard gland 200 and the outboard gland 300. An emergency fluid exit 614 provides for an emergency fluid dump if the outboard seal 116 fails, and/or provides a leak path if the outboard seal 116 leaks for any reason. In this manner, fluid can be removed from the pump. A vent plug 616 enables air to be expelled or vented from the chamber 608 when the tandem seal pump is started. Typically, the vent plug 616 is opened to allow air to be pushed out vent when pump is started during an initial use (e.g., pump shaft motor is turned on, rotating pump shaft impeller and forcing pumped fluid through housing 600). When the pump fluid comes out the vent plug 616, air has been vented from the chamber 608 and the vent plug 616 can be closed. A vertical plug 616 can be aligned with the flat area 214 of the inboard gland 200 to allow for greater venting of the chamber 608 during start-up.

With reference again to FIG. 2, additional elements of the tandem seal pump 100 become apparent from the preceding description. Also shown are the barrier fluid inlet 130 of the bearing housing 600 (e.g., barrier fluid inlet 610) and the barrier fluid inlet 132 of the inboard gland 106 (e.g., barrier fluid inlet 218). As described above, the barrier fluid inlet 130 can be aligned with, in fluid communication with, and coupled to the barrier fluid inlet 132, enabling fresh barrier fluid to be pumped into the inner chamber 112 formed within the inboard gland 106. Likewise, shown are the barrier fluid outlet 134 of the bearing housing 600 (e.g., barrier fluid outlet 612) and the barrier fluid outlet 136 of the inboard gland 106 (e.g., barrier fluid outlet 212). As described above, the barrier fluid outlet 134 can be aligned with, in fluid communication with, and coupled to the barrier fluid outlet 136, enabling the heated barrier fluid to be passed out of the inner chamber 112 from within the inboard gland 106. Also shown is the spring pin 138 that clocks the inboard gland 106 against the bearing housing 600. The spring pin 138 sits within a spring pinhole (e.g., spring pinhole 216) in a wide portion of the inboard gland 106. In this manner, the inboard gland 106 is prevented from rotating within the chamber 110 when the shaft 104 rotates.

An o-ring seal 120 and an o-ring seal 122 sit within a circumferential o-ring groove 140 (e.g., o-ring groove 312) of the outboard gland 108 and the circumferential o-ring groove 142 (e.g., o-ring groove 212) of the inboard gland 106, respectively. The o-ring 126 sits within the o-ring groove 144 (e.g., o-ring groove 310) of the outboard gland 108. The o-ring 144 seals the outboard gland 108 to the pump shaft 104, sealing the opening in the outboard end of the outboard gland 108. The o-ring 144 sits within a channel or groove 146 against the lip 148 of the pump shaft 104 (e.g., lip 406 and channel or groove 408).

With continuing reference to FIG. 2, the tandem seal pump 100 also includes a vertical plug 150, which enables air to be vented over the flat surface 152 (e.g., flat surface 214) of the inboard gland 106 and out of the chamber 110. Forced cooling air may be provided by a fan (e.g., fan 802 of FIG. 9) over the heat fins 156 on the pump housing. The forced cooling air can be directed or concentrated by the flow modifier 154 (e.g., flow modifier 500) to more effectively cool the pump housing 102, thereby aiding in maintaining a temperature of the seals below a threshold. Heat fins 156 further assist in cooling of the seals by conducting heat away from pump shaft 104 and chamber 110.

Figure 8:
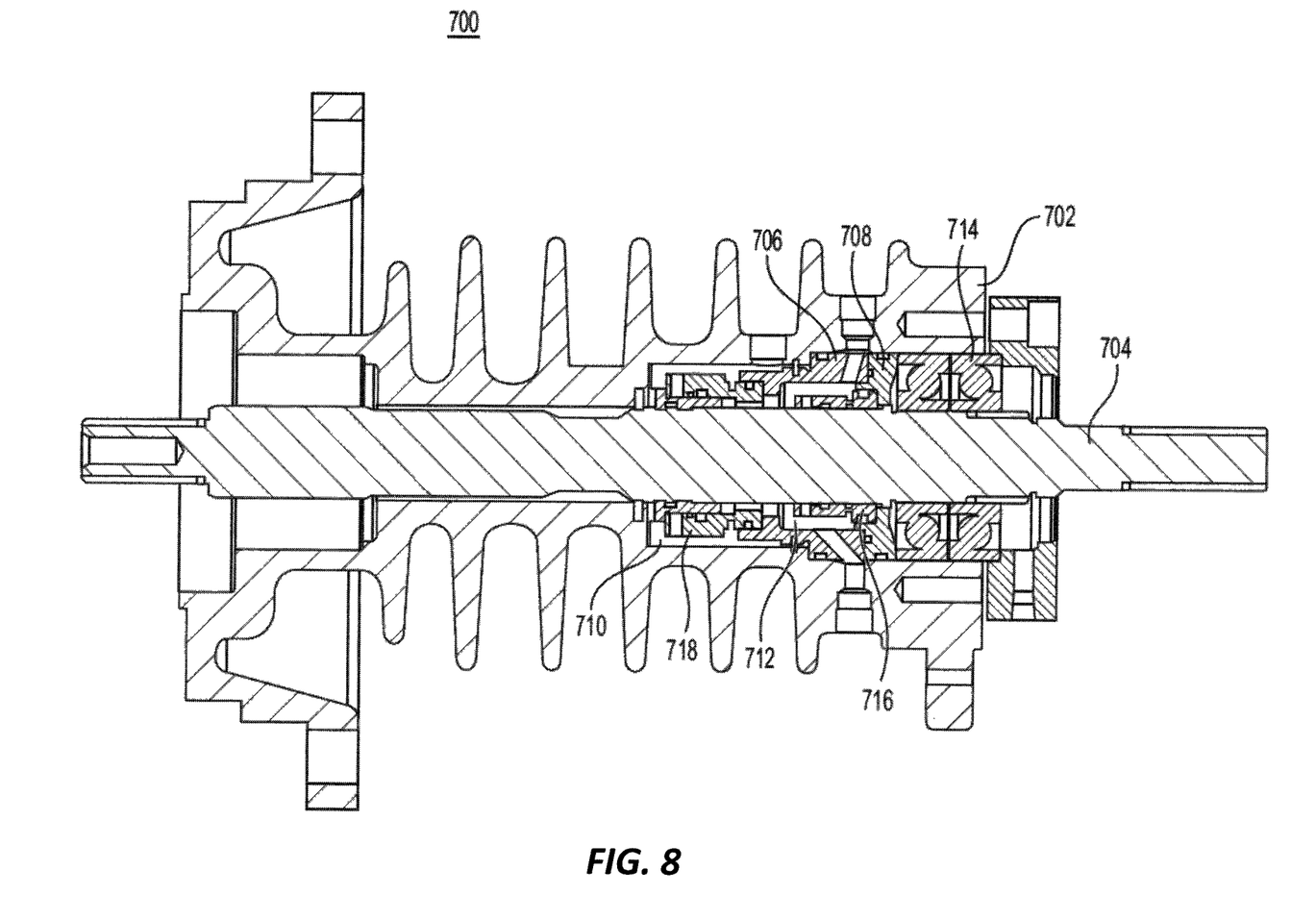
FIG. 8 shows another cross-sectional view of a pump housing.

With reference now to FIG. 8, shown is cross-section side view of an exemplary embodiment of a tandem seal pump 700. The view shown of the tandem seal pump 700 is an expanded view of the tandem seal pump 100 shown in FIG. 2. As shown, the tandem seal pump 700 includes a bearing housing 702, a pump shaft 704, an inboard gland 706, and an outboard gland 708. Within the bearing housing 702 is a chamber 710 through which the pump shaft 704 passes and in which the inboard gland 706 and the outboard gland 708 are positioned. The inboard gland 706 and the outboard gland 708 together form an inner or gland chamber 712 within the chamber 710. Also located within the chamber 710 are ball bearings 714, located adjacent to the outboard gland 708, the inboard seal 716, positioned within and sealing one end of the inner chamber 712, and the outboard seal 718, positioned within narrow end of the inboard gland 706 and the chamber 710 and sealing other end of the inner chamber 712. As is described in further detail herein, certain components of the tandem seal pump 700 positioned within the chamber 710, such as the inboard gland 706 and the outboard gland 708, remain stationary or fixed with respect to the housing 702, while other components rotate with the pump shaft 704.

Having disclosed various devices and methods, certain embodiments can include, but are not limited to:

In a first aspect, a pump having tandem seals comprises: a pump shaft; a pump housing, the pump housing defining a primary chamber between an interior surface of the pump housing and an outer surface of the pump shaft, wherein the pump shaft is disposed within the pump housing; an inboard seal; an outboard seal; and a gland assembly 106, 108, wherein the inboard seal, the outboard seal, and the gland assembly 106, 108 are configured to be disposed within the primary chamber of the pump housing, wherein the gland assembly 106, 108 is disposed between the inboard seal and the outboard seal, and wherein the inboard seal, the gland assembly 106, 108, and the outboard seal are configured to form a plurality of chambers within the pump housing.

A second aspect can include the pump of the first aspect, wherein the plurality of chambers comprise: an inboard chamber 107 defined between the interior surface of the pump housing, the outer surface of the pump shaft, and an inboard surface of the inboard seal; a barrier chamber defined by the gland assembly 106, 108, the outer surface of the pump shaft, an outboard surface of the inboard seal, and an inboard surface of the outboard seal, and an outboard chamber 109 defined by the outer surface of the pump shaft and an outboard surface of the outboard seal.

A third aspect can include the pump of the second aspect, further comprising: a barrier fluid disposed within the barrier chamber, wherein the barrier fluid is in contact with the outboard side of the inboard seal and an inboard side of the outboard seal.

A fourth aspect can include the pump of the second aspect, further comprising: a barrier fluid reservoir in fluid communication with the barrier chamber, wherein the barrier fluid reservoir is configured to pass barrier fluid to the barrier chamber and receive barrier fluid from the barrier chamber when the pump shaft is rotating.

A fifth aspect can include the pump of any one of the first to fourth aspects, wherein the inboard seal comprises: a rotational portion coupled to the pump shaft; and a stationary portion coupled to the gland assembly 106, 108, wherein an interface between the rotational portion and the stationary portion forms a seal.

A sixth aspect can include the pump of any one of the first to fifth aspects, further comprising: a pump coupled to an outboard end of the pump shaft; and a pump impeller 24 coupled to an inboard end of the pump shaft.

A seventh aspect can include the pump of the sixth aspect, further comprising: an inboard bearing 180 disposed between the pump impeller 24 and the pump housing; and an outboard bearing disposed between the pump housing and the pump, wherein the inboard seal, the gland assembly 106, 108, and the outboard seal disposed within the pump housing is between the inboard bearing 180 and the outboard bearing.

An eighth aspect can include the pump of the seventh aspect, wherein the inboard bearing 180 is configured to limit the flow of a pumped fluid from the pump impeller 24 to the primary chamber.

A ninth aspect can include the pump of any one of the first to eighth aspects, further comprising: a plurality of fan blades coupled to the pump shaft; one or more heat fins on an outer surface of the pump housing; and a flow modifier disposed between the plurality of fan blades and the one or more heat fins, wherein the flow modifier is configured to direct and concentrate an airflow from the plurality of fan blades onto the one or more heat fins of the pump housing when the pup shaft is rotating.

In a tenth aspect, a pump comprises: a pump shaft; a plurality of fan blades coupled to the pump shaft; a pump housing, wherein the pump housing comprises one or more heat fins on an outer surface of the pump housing, and wherein the pump shaft is disposed within and passes through the pump housing; and a flow modifier disposed between the plurality of fan blades and the one or more heat fins, wherein the flow modifier is configured to direct and concentrate an airflow from the plurality of fan blades onto the one or more heat fins of the pump housing when the pup shaft is rotating.

An eleventh aspect can include the pump of the tenth aspect, wherein the flow modifier comprises a cowling disposed over the pump shaft and the plurality of fan blades, and a skirt 500 angled away from the plurality of fan blades and towards the heat fins.

A twelfth aspect can include the pump of the tenth or eleventh aspect, further comprising: an inboard seal; an outboard seal; and a gland assembly 106, 108, wherein the pump housing defines a primary chamber between an interior surface of the pump housing and an outer surface of the pump shaft; wherein the inboard seal, the outboard seal, and the gland assembly 106, 108 are configured to be disposed within the primary chamber of the pump housing, wherein the gland assembly 106, 108 is disposed between the inboard seal and the outboard seal, and wherein the inboard seal, the gland assembly 106, 108, and the outboard seal are configured to form a plurality of chambers within the pump housing.

A thirteenth aspect can include the pump of the twelfth aspect, wherein the plurality of chambers comprises a barrier chamber defined by the gland assembly 106, 108, the outer surface of the pump shaft, an outboard surface of the inboard seal, and an inboard surface of the outboard seal.

A fourteenth aspect can include the pump of the thirteenth aspect, further comprising: a barrier fluid disposed within the barrier chamber; and a barrier fluid reservoir in fluid communication with the barrier chamber, wherein the barrier fluid reservoir is configured to pass the barrier fluid to the barrier chamber and receive the barrier fluid from the barrier chamber when the pump shaft is rotating.

A fifteenth aspect can include the pump of the fourteenth aspect, further comprising one or more barrier fluid heat fins 804 disposed on at least one of a supply line 34 or a return line 36 coupling the barrier fluid reservoir to the barrier chamber.

A sixteenth aspect can include the pump of any one of the tenth to fifteenth aspects, wherein the pump shaft comprises a portion 403 having a decreased diameter 405 relative to the maximum diameter of the pump shaft.

In a seventeenth aspect, a method of operating a pump having tandem seals comprises: rotating a pump shaft, wherein the pump shaft is disposed within a pump housing; pumping a fluid based on rotating the pump shaft; sealing the pumped fluid from an external environment using an inboard seal and an outboard seal disposed within the pump housing; rotating a plurality of fan blades coupled to the pump shaft based on rotating the pump shaft; generating an airflow based on rotating the plurality of fan blades; directing the airflow onto the pump housing; and maintaining a temperature of the inboard seal and the outboard seal below a threshold based on directing the airflow onto the pump housing.

An eighteenth aspect can include the method of the seventeenth aspect, wherein the pump housing comprises one or more heat fins, and wherein directing the airflow onto the pump housing comprises directing the airflow over the one or more heat fins.

A nineteenth aspect can include the method of the seventeenth or eighteenth aspect, wherein a barrier chamber is formed between the pump housing, an outer surface of the pump shaft, the inboard seal and the outboard seal, wherein the method further comprises: passing a barrier fluid from the barrier chamber to a barrier fluid reservoir; cooling the barrier fluid outside of the pump housing; and returning the cooled barrier fluid to the barrier chamber.

A twentieth aspect can include the method of the nineteenth aspect, wherein the outboard seal comprises a stationary portion and a rotational portion, and wherein passing the barrier fluid from the barrier chamber comprises: rotating the rotational portion of the outboard seal in response to rotating the pump shaft; and pumping the barrier fluid out of the barrier chamber in response to rotating the rotational portion of the outboard seal.

A twenty first aspect can include the method of the nineteenth or twentieth aspect, wherein cooling the barrier fluid comprises air cooling the barrier fluid in a return line to the barrier fluid reservoir.

A twenty second aspect can include the method of any one of the seventeenth to twenty first aspects, further comprising: supporting the pump shaft with an inboard bearing 180; limiting a flow of the fluid to a primary chamber formed within the pump housing using the inboard bearing 180; and limiting the convective heat transfer from the fluid to the inboard seal and the outboard seal based on limiting the flow of fluid to the primary chamber.

A twenty third aspect can include the method of any one of the seventeenth to twenty second aspects, wherein the pump shaft comprises a portion 403 having a decreased diameter 405 relative to the maximum diameter of the pump shaft, and wherein the method further comprises: controlling a temperature of the inboard seal and the outboard seal based, at least in part, on the decreased diameter 405 of the pump shaft.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed herein. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The endpoints of all ranges directed to the same component or property are inclusive of the endpoint and independently combinable. The term "from more than 0 to an amount" means that the named component is present in some amount more than 0, and up to and including the higher named amount.

The terms "a," "an," and "the" do not denote a limitation of quantity, but rather denote the presence of at least one of the referenced item. As used herein the singular forms "a," "an," and "the" include plural referents. As used herein, "combinations thereof" is inclusive of one or more of the recited elements, optionally together with a like element not recited, e.g., inclusive of a combination of one or more of the named components, optionally with one or more other components not specifically named that have essentially the same function. As used herein, the term "combination" is inclusive of blends, mixtures, alloys, reaction products, and the like. Reference throughout the specification to "an embodiment," "another embodiment," "other embodiments," "some embodiments," and so forth, means that a particular element (e.g., feature, structure, property, and/or characteristic) described in connection with the embodiment is included in at least an embodiment described herein, and may or may not be present in other embodiments. In addition, it is to be understood that the described element(s) can be combined in any suitable manner in the various embodiments. As used herein, the terms "inhibiting" or "reducing" or "preventing" or "avoiding" or any variation of these terms, include any measurable decrease or complete inhibition to achieve a desired result. As used herein, the term "effective," means adequate to accomplish a desired, expected, or intended result.

As used herein, the terms "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains") are inclusive or open-ended and do not exclude additional, unrecited elements or method steps.

Unless defined otherwise, technical and scientific terms used herein have the same meaning as is commonly understood by one of skill in the art.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A pump for pumping a pumped fluid, the pump comprising:
    a pump shaft;
    a pump housing, the pump housing defining a primary chamber between an interior surface of the pump housing and an outer surface of the pump shaft, wherein the pump shaft is disposed within the pump housing, wherein the pumped fluid is present in the primary chamber;
    an inboard seal comprising a rotational portion and a stationary portion;
    an outboard seal;
    an inboard gland; and
    an outboard gland,
    wherein the inboard seal, the outboard seal, the inboard gland and the outboard gland are disposed within the primary chamber of the pump housing,
    wherein the inboard gland and the outboard gland are stationary with respect to the pump housing;
    wherein the stationary portion of the inboard seal is coupled to the inboard gland,
    wherein the inboard gland and the outboard gland are engaged together to form a gland assembly,
    wherein the outboard gland fits within an outboard opening of the inboard gland to form a barrier chamber, and
    wherein the inboard seal, the gland assembly, and the outboard seal are configured to form a plurality of chambers within the pump housing.

2. The pump of claim 1, wherein the plurality of chambers comprise:
    an inboard chamber defined between the interior surface of the pump housing, the outer surface of the pump shaft, and an inboard surface of the inboard seal;
    the barrier chamber defined by the gland assembly, the outer surface of the pump shaft, an outboard surface of the inboard seal, and an inboard surface of the outboard seal, and an outboard chamber defined by the outer surface of the pump shaft and an outboard surface of the outboard seal.

3. The pump of claim 2, further comprising:
a barrier fluid disposed within the barrier chamber, wherein the barrier fluid is in contact with an outboard side of the inboard seal and an inboard side of the outboard seal.

4. The pump of claim 2, further comprising:
a barrier fluid reservoir in fluid communication with the barrier chamber, wherein the barrier fluid reservoir is configured to pass barrier fluid to the barrier chamber and receive barrier fluid from the barrier chamber when the pump shaft is rotating.

5. The pump of claim 1, wherein the inboard seal comprises:
the rotational portion coupled to the pump shaft; and
the stationary portion coupled to the gland assembly, wherein an interface between the rotational portion and the stationary portion forms a seal.

6. The pump of claim 1, further comprising:
a motor coupled to an outboard end of the pump shaft; and
a pump impeller coupled to an inboard end of the pump shaft.

7. The pump of claim 6, further comprising:
an inboard bearing disposed between the pump impeller and the pump housing; and
an outboard bearing disposed between the pump housing and the motor, wherein the inboard seal, the gland assembly, and the outboard seal disposed within the pump housing is between the inboard bearing and the outboard bearing.

8. The pump of claim 7, wherein the inboard bearing is configured to limit the flow of the pumped fluid from the pump impeller to the primary chamber.

9. The pump of claim 1, further comprising:
a plurality of fan blades coupled to the pump shaft;
one or more heat fins on an outer surface of the pump housing; and
a flow modifier disposed between the plurality of fan blades and the one or more heat fins, wherein the flow modifier is configured to direct and concentrate an airflow from the plurality of fan blades onto the one or more heat fins of the pump housing when the pump shaft is rotating.

10. The pump of claim 9, wherein the flow modifier comprises a cowling disposed over the pump shaft and the plurality of fan blades, and a skirt angled away from the plurality of fan blades and towards the heat fins.

11. The pump of claim 1, further comprising one or more barrier fluid heat fins disposed on at least one of a supply line or a return line coupling the barrier fluid reservoir to the barrier chamber.

12. The pump of claim 1, wherein the pump shaft comprises a portion having a decreased diameter relative to a maximum diameter of the pump shaft.

13. A method of pumping a pumped fluid, comprising providing a pump according to claim 1,
rotating the pump shaft, wherein the pump shaft is disposed within the pump housing;
pumping the pumped fluid based on rotating the pump shaft;
sealing the pumped fluid from an external environment using the inboard seal and the outboard seal disposed within the pump housing;
rotating a plurality of fan blades coupled to the pump shaft based on rotating the pump shaft;
generating an airflow based on rotating the plurality of fan blades; and
directing the airflow onto the pump housing
to cool the inboard seal and the outboard seal.

14. The method of claim 13, wherein the pump housing comprises one or more heat fins, and wherein directing the airflow onto the pump housing comprises directing the airflow over the one or more heat fins.

15. The method of claim 13, wherein the method further comprises:
passing a barrier fluid from the barrier chamber to a barrier fluid reservoir;
cooling the barrier fluid outside of the pump housing; and
returning the cooled barrier fluid to the barrier chamber.

16. The method of claim 15, wherein the outboard seal comprises a stationary portion and a rotational portion, and wherein passing the barrier fluid from the barrier chamber comprises:
rotating the rotational portion of the outboard seal in response to rotating the pump shaft; and
pumping the barrier fluid out of the barrier chamber in response to rotating the rotational portion of the outboard seal.

17. The method of claim 15, wherein cooling the barrier fluid comprises air cooling the barrier fluid in a return line to the barrier fluid reservoir.

18. The method of claim 13, further comprising:
supporting the pump shaft with an inboard bearing; and
limiting a flow of the dumped fluid to the primary chamber formed within the pump housing using the inboard bearing, to limit
convective heat transfer from the pumped fluid to the inboard seal and the outboard seal.

19. The method of claim 13, further comprising: providing the pump shaft with a portion having a decreased diameter relative to a maximum diameter of the pump shaft to reduce conductive heat transfer to
the inboard seal and the outboard seal.

* * * * *